(12) United States Patent
Irving

(10) Patent No.: US 10,139,575 B2
(45) Date of Patent: Nov. 27, 2018

(54) MALE TO MALE AND FEMALE TO FEMALE CONNECTORS

(71) Applicant: FiberNext, LLC, Concord, NH (US)

(72) Inventor: Ryan M. Irving, Canaan, NH (US)

(*) Notice: Subject to any disclaimer, the term of this patent is extended or adjusted under 35 U.S.C. 154(b) by 0 days.

(21) Appl. No.: 15/166,718

(22) Filed: May 27, 2016

(65) Prior Publication Data

US 2016/0349465 A1 Dec. 1, 2016

Related U.S. Application Data

(60) Provisional application No. 62/168,388, filed on May 29, 2015.

(51) Int. Cl.
*G02B 6/38* (2006.01)

(52) U.S. Cl.
CPC .................. *G02B 6/3893* (2013.01)

(58) Field of Classification Search
CPC .. G02B 6/3893; G02B 6/3825; G02B 6/3897; G02B 6/38; G02B 6/3885; G02B 6/3887
See application file for complete search history.

(56) References Cited

U.S. PATENT DOCUMENTS

| | | | | |
|---|---|---|---|---|
| 4,736,743 A * | 4/1988 | Daikuzono | ............. | A61B 18/22 606/17 |
| 5,267,342 A * | 11/1993 | Takahashi | .............. | G02B 6/266 385/140 |
| 6,043,550 A * | 3/2000 | Kuhara | ............ | H01L 31/02162 257/233 |
| 7,585,118 B1 * | 9/2009 | Lumpkin | ............. | G02B 6/3825 385/53 |
| 8,402,587 B2 * | 3/2013 | Sugita | .................. | G02B 6/3807 15/210.1 |
| 2009/0135429 A1 * | 5/2009 | Masuda | ................. | G02B 6/327 356/477 |
| 2013/0084042 A1 * | 4/2013 | Bouchard | ............ | G02B 6/3849 385/78 |

* cited by examiner

*Primary Examiner* — Jennifer Doan
(74) *Attorney, Agent, or Firm* — Michael Persson; Catherine Napjus; Lawson, Persson & Chisholom, P.C.

(57) ABSTRACT

The connector of the present invention includes a probing portion, a center portion, and an accepting portion, where each of the probing and accepting portions includes a connector of the same sex. That is to say, that both the probing and accepting portions of the connector terminate in the same sex connector type.

18 Claims, 1 Drawing Sheet

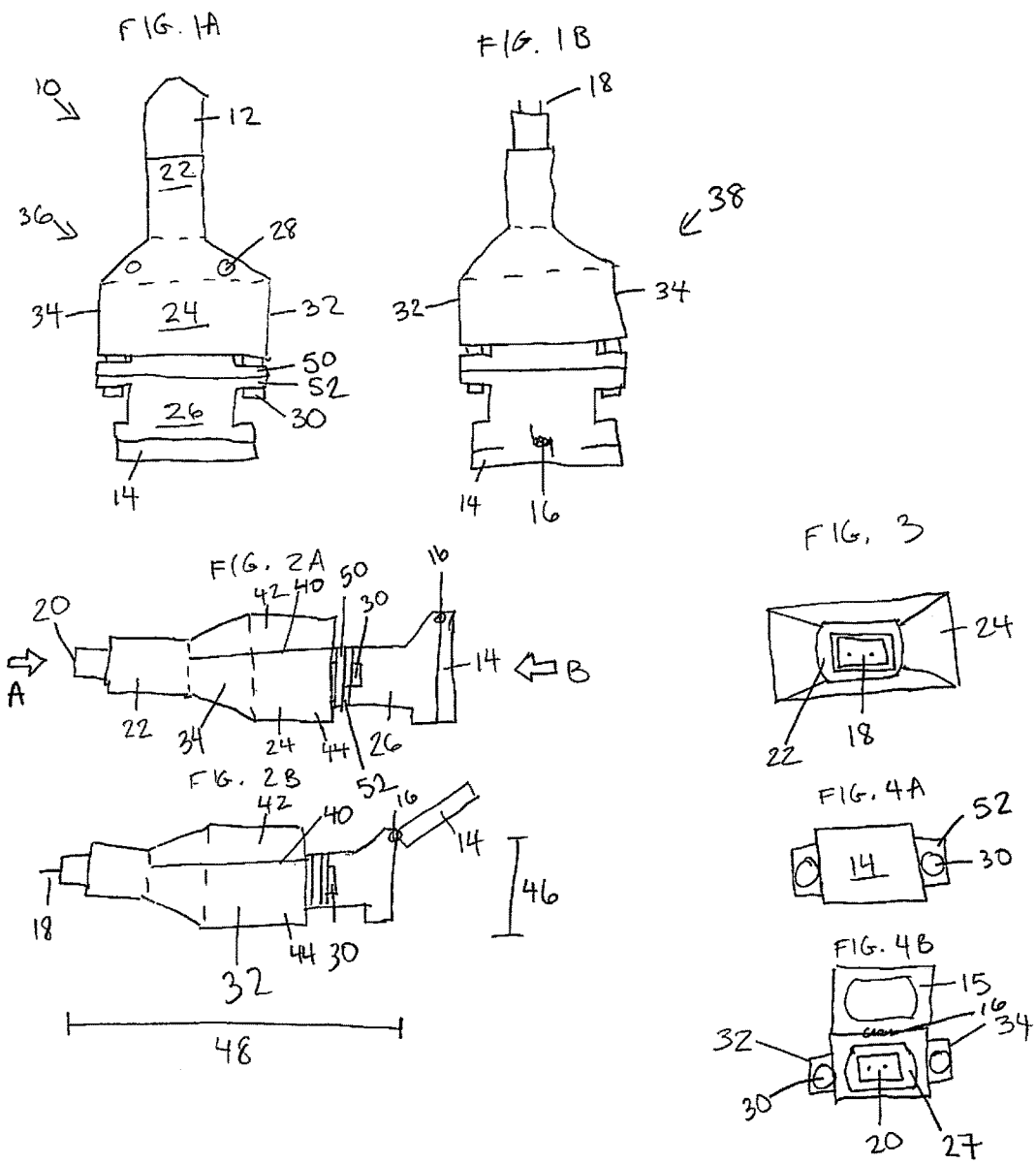

MALE TO MALE AND FEMALE TO FEMALE CONNECTORS

CLAIM OF PRIORITY

This application is claims the benefit of U.S. Provisional Patent Application Ser. No. 62/168,388, which was filed on May 29, 2015.

FIELD OF THE INVENTION

The present invention relates generally to fiber connectors, and specifically, to male to male and female to female MPO connectors

BACKGROUND

Fiber optic systems typically terminate in connectors, such as MPO connectors. These connectors are either male or female and are specifically adapted to mate with one another to align the fiber optic fibers in the proper position. Attaching connectors to fiber optic cables is not an easy task and is difficult to effectively accomplish in the field. Accordingly, systems are often ordered with connectors attached to the desired lengths of cable at the factory. However, there is no convention for whether a male or female connector is used at any given termination point and it is common for a user to need to connect two female connectors or two male connectors.

Recently, fiber cables that terminate at both ends in a female connector or at both ends in a male connector have become available. Examples of such cables include those sold under the trademark PANMPO. In many cases, however, the user does not want or need the additional length of a full fiber cable. Therefore there is a need for a compact male to male or female to female connector that does not include a significant length of fiber cable between the same sex connectors.

SUMMARY OF THE INVENTION

The present invention is a male to male connector and a female to female connector.

In its most basic form, the connector of the present invention includes a probing portion, a center portion, and an accepting portion, where each of the probing and accepting portions include a connector of the same sex. That is to say, that both the probing and accepting portions of the connector terminate in the same sex connector type.

It is preferred that the connectors are MPO-type connectors, but may be any type of connector commonly used in the art, so long as the connectors at the probing and accepting portions are the same sex.

In the preferred embodiment, the probing, center, and accepting portions are separate off-the-shelf pieces that are fit together around a short piece of fiber that terminates at one end at the probing portion and at the other end at the accepting portion, both with the same sex connector. The center portion preferably has a trapezoidal shape and is split into first and second pieces along a divide. In addition, the center portion and accepting portions each preferably include a flange region that is matched on each portion so that the flange regions of each may be mated flush against one another. The probing, center, and accepting portions are held together around the fiber by any means commonly used in the art, but preferably by two center portion screws disposed through the depth of the center portion and two center-accepting portion screws disposed through the flange regions of the center and accepting portions.

In some embodiments, any two or all three of the probing, center, and accepting portions are integrated into a single molded piece around the fiber terminating in the same sex connectors.

In preferred embodiments, the accepting portion includes a slightly sunken hole into which a connector of the opposite sex may be introduced so as to mate with connector included in the accepting portion. It is also preferred that the accepting portion with the hole include a lid with a hinge so that the hole is covered by the lid when the connector of the accepting portion is not connected to another connector.

It is preferred that the probing portion include a cap that fits over the connector included at the end of the probing portion to protect the connector when it is not connected to another connector.

It is preferred that the connector of the present invention has a length of only approximately 2-3" from the connector at the end of the probing portion to the end of the accepting portion. This is a significant improvement over entire long cables that terminate in same sex connectors on each end. Such cables are long and unwieldy and add unnecessary latency as light travels through the length of the fiber, when in many cases, only a connector sex change is needed, rather than additional cable length. The compact same sex connector of the present invention may be used quickly and easily to patch together like-sexed cables and this patch may be used permanently.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIG. 1A is a front view of a connector of the present invention.

FIG. 1B is a back view of a connector of the present invention.

FIG. 2A is a left side view of a connector of the present invention.

FIG. 2B is a right side view of a connector of the present invention.

FIG. 3 is top down view of a connector of the present invention along arrow A, as shown in FIG. 2A.

FIG. 4A is top down view of a connector of the present invention along arrow B, as shown in FIG. 2A, with the lid closed over the accepting portion.

FIG. 4B is top down view of a connector of the present invention along arrow B, as shown in FIG. 2A, with the lid open over the accepting portion.

DETAILED DESCRIPTION

Referring first to FIGS. 1A and 1B, front and back views of connector 10 are provided, respectively. Front 36 and back 38 are largely arbitrary designations, as each is substantially similar. As explained in more detail below, however, the preferred connector 10 includes lid 14 with hinge 16, which is slightly different between front 36 and back 38 because hinge 16 is on one of front 36 or back 38 and lid 14 opens on the other of front 36 or back 38. In addition, the preferred center portion 24 is held together by center portion screws 30, which may only be visible from front 36 or back 38.

Connector 10 includes probing portion 22, center portion 24, and accepting portion 26. In FIG. 1A, cap 12 is shown covering male connection 18 (shown in FIG. 1B). Cap 12 fits snugly around male connection 18 to protect it when it is not connected to another connector. Cap 12 is only shown in FIG. 1A, and has been omitted from view in FIGS. 1B, 2A, 2B, and 3, but it is understood that preferred embodiments of connector 10 include cap 12 over the connection 18 or 20 at the end of probing portion 22. Although male connection 18 is shown in FIG. 1B, it is understood that the end of probing portion 22 may be a female connection 20, such as shown in FIG. 2A. Male connections 18 include two small pins extending outward. Female connections 20 include two small holes extending inward, which are sized and spaced so as to be able to accept the pins of a male connection 18.

Center portion 24 is substantially trapezoidal, as shown. The dotted lines indicate an indentation or angle in the surface, and that the surface is not flat or flush along that dotted line. Center portion 24 includes center portion flange 50 extending toward accepting portion 26. Accepting portion 26 includes accepting portion flange 52 extending toward center portion 24. As shown, center portion flange 50 and accepting portion flange 52 are sized and shaped so as to be held flush against one another. Center-accepting portion screws 30 extend through flanges 50, 52 so as to hold center portion 24 and accepting portion 26 securely together.

Now referring to FIGS. 2A and 2B, left and right views of connector 10 are provided, respectively. Left and right sides 34, 32 are substantially similar. Although not visible, it is understood that a short length of fiber extends between the female or male connections 18, 20 disposed at probing and accepting portions 22, 26. FIG. 2A shows female connection 20 at the end of probing portion 22, as indicated by the lack of pins. FIG. 2B shows male connection 18 at the end of probing portion 22, as indicated by the inclusion of pins. In FIG. 2A, lid 14 is closed at the end of accepting portion 26. In FIG. 2B, lid 14 is open at the end of accepting portion 26. Center portion divide 40 is visible along center portion 24. Center portion divide 40 divides center portion 24 into center portion first and second pieces 42, 44 through depth 46. First and second pieces 42, 44 are held together and around the fiber by center portion screws 28, as shown in FIG. 1A. Connector 10 has length 48, which is preferably 2-3", but may be greater than or less than this range.

In FIGS. 1A, 1B, 2A, and 2B, probing portion 22 is shown with cap 12 and accepting portion 26 is shown with lid 14. In some embodiments, both probing portion 22 and accepting portion include cap 12 or both include lid 14. In addition, the designations of "probing" and "accepting" are largely arbitrary. As each portion ends in a connector of the same sex, either or both of probing portion 22 and accepting portion 26 may include the features detailed herein for one or the other.

Now referring to FIG. 3, a top down view of connector 10 as shown from line of sight arrow A, as shown in FIG. 2A, is provided. The angled sides of center portion 24 are visible on all sides of the smaller probing portion 22. Male connection 18 is shown at the end of probing portion 22.

Now referring to FIGS. 4A and 4B, a top down view of connection 10 as shown from line of sight arrow B, as shown in FIG. 2A, is provided. Center-accepting portion screws 30 are visible on either side of accepting portion 26, extending through accepting portion flanges 52 and center portion flanges 50 (not shown, but understood to be immediately behind accepting portion flanges 52). In FIG. 4A, lid 14 is closed so that female connection 20 is hidden from view and protected. In FIG. 4B, lid 14 is open and inner lid 15 is visible. As shown, it is preferable that inner lid 15 include an indentation that is sized and shaped to align with hole 27 when lid 14 is closed. Although not obvious from this view, the uncovered end of accepting portion 26 includes hole 27 so that female connection 20 is actually sunk into accepting portion 26.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. A male to male connector comprising:
   a probing portion;
   an accepting portion, wherein said accepting portion comprises an accepting portion flange;
   a center portion disposed between said probing portion and said accepting portion, wherein said center portion comprises a center portion flange; and
   a fiber extending through said probing portion, said center portion, and said accepting portion, wherein said fiber terminates in a male connector at said probing portion and terminates in a male connector at said accepting portion;
   wherein said accepting portion flange and said center portion flange are securely held disposed flush against one another.

2. The male to male connector as claimed in claim 1, wherein one of a group consisting of said probing portion, said accepting portion, and said probing and accepting portions comprises at least one cap that fits snugly over said male connector at a corresponding one of the group consisting of said probing portion, said accepting portion, and said probing and accepting portions.

3. The male to male connector as claimed in claim 1, wherein one of a group consisting of said probing portion, said accepting portion, and said probing and accepting portions comprises at least one lid that closes over said male connector at a corresponding one of the group consisting of said probing portion, said accepting portion, and said probing and accepting portions.

4. The male to male connector as claimed in claim 3, wherein said at least one lid covers a hole within the corresponding one of the group consisting of said probing portion, said accepting portion, and said probing and accepting portions, and said male connector at the corresponding one of the group consisting of said probing portion, said accepting portion, and said probing and accepting portions is sunken within said hole.

5. The male to male connector as claimed in claim 3, wherein said at least one lid is operable to open and close via a hinge.

6. The male to male connector as claimed in claim 1, wherein said accepting portion flange and said center portion flange are securely held disposed flush against one another with center-accepting portion screws.

7. The male to male connector as claimed in claim 1, wherein:
   said center portion comprises a center portion divide extending between said probing portion and said accepting portion, and dividing said center portion into a center portion first piece and a center portion second piece; and
   said center portion first and second pieces are held securely together.

8. The male to male connector as claimed in claim 7, wherein said center portion first and second pieces are held securely together with center portion screws.

9. The male to male connector as claimed in claim 1, further comprising a length encompassing said probing portion, said center portion, and said accepting portion of between 2 and 3 inches.

10. A female to female connector comprising:
- a probing portion;
- an accepting portion, wherein said accepting portion comprises an accepting portion flange;
- a center portion disposed between said probing portion and said accepting portion, wherein said center portion comprises a center portion flange; and
- a fiber extending through said probing portion, said center portion, and said accepting portion, wherein said fiber terminates in a female connector at said probing portion and terminates in a female connector at said accepting portion;
- wherein said accepting portion flange and said center portion flange are securely held disposed flush against one another.

11. The female to female connector as claimed in claim 10, wherein one of a group consisting of said probing portion, said accepting portion, and said probing and accepting portions comprises at least one cap that fits snugly over said female connector at a corresponding one of the group consisting of said probing portion, said accepting portion, and said probing and accepting portions.

12. The female to female connector as claimed in claim 10, wherein one of a group consisting of said probing portion, said accepting portion, and said probing and accepting portions comprises at least one lid that closes over said female connector at a corresponding one of the group consisting of said probing portion, said accepting portion, and said probing and accepting portions.

13. The female to female connector as claimed in claim 12, wherein said at least one lid covers a hole within the corresponding one of the group consisting of said probing portion, said accepting portion, and said probing and accepting portions, and said male connector at the corresponding one of the group of said probing portion, said accepting portion, and said probing and accepting portions is sunken within said hole.

14. The female to female connector as claimed in claim 12, wherein said at least one lid is operable to open and close via a hinge.

15. The female to female connector as claimed in claim 10, wherein said accepting portion flange and said center portion flange are securely held disposed flush against one another with center-accepting portion screws.

16. The female to female connector as claimed in claim 10, wherein:
- said center portion comprises a center portion divide extending between said probing portion and said accepting portion, and dividing said center portion into a center portion first piece and a center portion second piece; and
- said center portion first and second pieces are held securely together.

17. The female to female connector as claimed in claim 16, wherein said center portion first and second pieces are held securely together with center portion screws.

18. The female to female connector as claimed in claim 10, further comprising a length encompassing said probing portion, said center portion, and said accepting portion of between 2 and 3 inches.

* * * * *